(12) United States Patent
Wei

(10) Patent No.: US 10,241,342 B2
(45) Date of Patent: Mar. 26, 2019

(54) STEREOSCOPIC DISPLAY DEVICE AND METHOD FOR MANUFACTURING THE SAME

(71) Applicant: BOE TECHNOLOGY GROUP CO., LTD., Beijing (CN)

(72) Inventor: Wei Wei, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 359 days.

(21) Appl. No.: 14/906,522

(22) PCT Filed: Jul. 16, 2015

(86) PCT No.: PCT/CN2015/084193
§ 371 (c)(1),
(2) Date: Jan. 20, 2016

(87) PCT Pub. No.: WO2016/123910
PCT Pub. Date: Aug. 11, 2016

(65) Prior Publication Data
US 2017/0017086 A1    Jan. 19, 2017

(30) Foreign Application Priority Data

Feb. 5, 2015 (CN) .......................... 2015 1 0061899

(51) Int. Cl.
*G02B 27/22* (2018.01)
*H04N 13/305* (2018.01)
(Continued)

(52) U.S. Cl.
CPC ..... *G02B 27/2214* (2013.01); *G02B 27/0025* (2013.01); *H04N 13/305* (2018.05);
(Continued)

(58) Field of Classification Search
CPC ............ G02B 27/2214; G02B 27/0025; G02B 27/2228; G02B 27/60; G02B 27/64
See application file for complete search history.

(56) References Cited

U.S. PATENT DOCUMENTS 8,254,026 B2    8/2012 Hong et al.
2010/0259697 A1    10/2010 Sakamoto et al.

FOREIGN PATENT DOCUMENTS

CN    101122684 A    2/2008
CN    101167371 A    4/2008
(Continued)

OTHER PUBLICATIONS

Office Action in Chinese Application No. 201510061899.2 dated Jun. 20, 2016, with English translation. 8 pages.
(Continued)

*Primary Examiner* — Darryl J Collins
*Assistant Examiner* — Journey F Sumlar
(74) *Attorney, Agent, or Firm* — Womble Bond Dickinson (US) LLP

(57) ABSTRACT

The embodiments of the present invention provide a stereoscopic display device and a method for manufacturing the same, relating to the technical field of display; the stereoscopic display device and the method for manufacturing the same can reduce Moire fringe phenomenon during displaying of a naked eye 3D display device. The stereoscopic display device comprises a display panel and a grating, wherein the display panel comprises a plurality of first display units and a plurality of second display units, the plurality of first display units and the plurality of second display units are arranged alternately in a Y direction of the display panel; the grating comprises a plurality of optical structures arranged parallel to each other; a preset angle β is arranged between the optical structure and an X direction of (Continued)

the display panel, thereby reducing Moire fringe phenomenon during displaying.

18 Claims, 10 Drawing Sheets

(51) Int. Cl.
*H04N 13/324* (2018.01)
*G02B 27/00* (2006.01)
*H04N 13/31* (2018.01)
*H04N 13/317* (2018.01)

(52) U.S. Cl.
CPC .......... *H04N 13/31* (2018.05); *H04N 13/317* (2018.05); *H04N 13/324* (2018.05)

(56) References Cited

FOREIGN PATENT DOCUMENTS

| CN | 02004324 A | 4/2011 |
|---|---|---|
| CN | 102591025 A | 7/2012 |
| CN | 102707448 | 10/2012 |
| CN | 103558690 | 2/2014 |
| CN | 203444166 | 2/2014 |
| CN | 103676176 | 3/2014 |
| CN | 104570370 | 4/2015 |
| EP | 0752609 A2 | 1/1997 |
| JP | H 6-294955 A | 10/1994 |
| KR | 10-2099-0060061 | 6/2009 |
| TW | 1359609 B | 3/2012 |

OTHER PUBLICATIONS

International Search Report and Written Opinion with English Language Translation, dated Nov. 3, 2015, Application No. PCT/CN2015/084193.

Supplementary European Search Report and Written Opinion received for Ep Patent Application No. 15832666.0, dated Jul. 16, 2018, 8 pages.

US 10,241,342 B2

STEREOSCOPIC DISPLAY DEVICE AND METHOD FOR MANUFACTURING THE SAME

FIELD OF THE INVENTION

The present invention relates to the technical field of display, in particular to a stereoscopic display device and a method for manufacturing the same.

BACKGROUND OF THE INVENTION

Stereoscopic display device has characteristics of large amount of information, being capable of reproducing all the three-dimensional information of an actual scene, so that a viewer can see the distance and depth of each object in an image from the display device directly, thus the viewer can obtain more overall and intuitive information. Therefore, with the rapid development of the stereoscopic display technology, there is also a growing demand for stereoscopic display device. Traditional stereoscopic display device requires the viewer wearing assistant tools such as polarized glasses, complementary colors glasses or LCD shutter glasses; though it has a good stereoscopic effect, it is not suit for public places, especially the advertising display and so on. Therefore, the naked eye stereoscopic display technology without the aid of an external assistant tool has become a research hotspot in the field of display technology at present.

The existing naked eye three-dimensional stereoscopic display technology is mainly developed based on binocular parallax, which is mainly grating stereoscopic display device. In a grating stereoscopic display device, a grating should be mounted on a display panel of a plane display device. The grating can be a lenticular grating or a slit grating; the displayed images can then be separated with the separating effect of the grating.

In particular, as shown in FIG. 1a, a grating 11 (taking a slit grating as an example) is an optical device composed of a plurality of spaced slits 111; each slit 111 of the slit grating 11 can expose a part of a plurality of sub pixels. A single eye of a viewer can only see sub pixels of one column on the display panel 10 through one slit on the grating; for example, a left eye can only see sub pixels of the odd columns; a right eye can only see sub pixels of the even columns. In this way, a pair of stereoscopic images with horizontal parallax is formed by two images respectively composed of sub pixels of odd and even columns; by means of the fusion activity of the brain, a stereoscopic image with depth perception is ultimately formed.

However, as shown in FIG. 1b, light emitted from each sub pixel of the display panel 10 passes through a black matrix 12 and an array of the grating 11; since the spatial frequency of the black matrix 12 is close to the spatial frequency of the grating 11, the superposition of light passing through the black matrix 12 and light passing through the grating 11 forms bright and dark stripes, resulting in visual block, i.e. the Moire fringes shown in FIG. 1c, reducing the effect of stereoscopic display.

SUMMARY OF THE INVENTION

The embodiments of the present invention provide a stereoscopic display device and a method for manufacturing the same, which can reduce Moire fringe phenomenon during displaying of a naked eye 3D display device.

To this end, embodiments of the present invention provide the following solutions.

An embodiment of the present invention provides a stereoscopic display device; the stereoscopic display device comprises a display panel and a grating, wherein the display panel comprises a plurality of first display units and a plurality of second display units, the plurality of first display units and the plurality of second display units are arranged alternately in a Y direction of the display panel;

the grating comprises a plurality of optical structures arranged parallel to each other; a preset angle β is arranged between the optical structure and an X direction of the display panel, thereby reducing Moire fringe phenomenon during displaying.

Optionally, each first display unit and each second display unit respectively comprises m sub pixels arranged in the Y direction;

wherein m≥1; a size of the sub pixel in the Y direction is smaller than a size of the sub pixel in the X direction, the Y direction being perpendicular to the X direction;

$0.8\theta \leq \beta \leq 1.2\theta$;

wherein $$\theta = \arctan\left[\left(\frac{T}{m} + \frac{1}{2 \times m}\right)\text{Pixel}\right];$$

T is a sub pixels number of a layout position difference in the Y direction between two first display units respectively positioned in two adjacent columns, or a sub pixels number of a layout position difference in the Y direction between two second display units respectively positioned in two adjacent columns, T being a positive integer of 1~100;

Pixel is the size of the sub pixel in the X direction.

Optionally, θ meets:

$$|\alpha - \theta| > \arccos\frac{P^2\left[n^2\left(\frac{A}{3} \times \sin\alpha\right)^2 + B^2\right] - \left(\frac{A}{2} \times \sin\alpha\right)^2 + B^2}{2n\left(\frac{A}{3} \times \sin\alpha\right)BP^2}$$

wherein α is an angle between a diagonal of the sub pixel and the Y direction;

A is the size of the sub pixel in the Y direction;

P is a width of the smallest Moire fringe which can be identified by human eyes;

n is a sampling number for Moire fringes, being a positive integer;

B is a grating pitch of the grating.

Optionally, θ meets:

$$\theta > \arccos\frac{P^2(n^2A^2 + B^2) - A^2B^2}{2nABP^2}.$$

Optionally, θ meets:

$$\theta < 90° - \arccos\frac{P^2(n^2A^2/9 + B^2) - A^2B^2/9}{2nABP^2/3}.$$

Optionally, two sub pixels form a square;

$$\theta = \arctan\left[\left(\frac{T}{2} + 0.25\right)\text{Pixel}\right];$$

T is 1, 2 or 3.

Optionally, one sub pixel forms a square;

θ=arctan [(T+0.5)Pixel];

T is 1, 2 or 3.

Optionally, the sub pixel is a red sub pixel, a blue sub pixel or a green sub pixel.

Optionally, the grating is a slit grating or a lenticular grating.

Optionally, the display panel comprises a liquid crystal display panel;

the grating is arranged on a light input side or a light output side of the liquid crystal display panel.

Optionally, the display panel comprises an organic electroluminescent diode display panel;

the grating is arranged on a light output side of the organic electroluminescent diode display panel.

An embodiment of the present invention also provides a method for manufacturing a stereoscopic display device; the method comprises providing a display panel and a grating, wherein the display panel comprises a plurality of first display units and a plurality of second display units, the plurality of first display units and the plurality of second display units are arranged alternately in a Y direction of the display panel;

the grating comprises a plurality of optical structures arranged parallel to each other; a preset angle β is arranged between the optical structure and an X direction of the display panel, thereby reducing Moire fringe phenomenon during displaying.

Optionally, each first display unit and each second display unit respectively comprises m sub pixels arranged in the Y direction;

wherein m≥1; a size of the sub pixel in the Y direction is smaller than a size of the sub pixel in the X direction, the Y direction being perpendicular to the X direction;

0.8θ≤β≤1.2θ;

wherein $$\theta = \arctan\left[\left(\frac{T}{m} + \frac{1}{2\times m}\right)\text{Pixel}\right];$$

T is a sub pixels number of a layout position difference in the Y direction between two first display units respectively positioned in two adjacent columns, or a sub pixels number of a layout position difference in the Y direction between two second display units respectively positioned in two adjacent columns, T being a positive integer of 1~100;

Pixel is the size of the sub pixel in the X direction.

Optionally, θ meets:

$$|\alpha - \theta| > \arccos \frac{P^2\left[n^2\left(\frac{A}{3}\times\sin\alpha\right)^2 + B^2\right] - \left(\frac{A}{2}\times\sin\alpha\right)^2 B^2}{2n\left(\frac{A}{3}\times\sin\alpha\right)BP^2}$$

wherein α is an angle between a diagonal of the sub pixel and the Y direction;

A is the size of the sub pixel in the Y direction;

P is a width of the smallest Moire fringe which can be identified by human eyes;

n is a sampling number for Moire fringes, being a positive integer;

B is a grating pitch of the grating.

Optionally, θ meets:

$$\theta > \arccos \frac{P^2(n^2A^2 + B^2) - A^2B^2}{2nABP^2}.$$

Optionally, θ meets:

$$\theta < 90° - \arccos \frac{P^2(n^2A^2/9 + B^2) - A^2B^2/9}{2nABP^2/3}.$$

Optionally, two sub pixels form a square;

$$\theta = \arctan\left[\left(\frac{T}{2} + 0.25\right)\text{Pixel}\right];$$

T is 1, 2 or 3.

Optionally, one sub pixel forms a square;

θ=arctan [(T+0.5)Pixel];

T is 1, 2 or 3.

Optionally, the sub pixel is a red sub pixel, a blue sub pixel or a green sub pixel.

Optionally, the grating is a slit grating or a lenticular grating.

Optionally, the display panel comprises a liquid crystal display panel;

the grating is arranged on a light input side or a light output side of the liquid crystal display panel.

Optionally, the display panel comprises an organic electroluminescent diode display panel;

the grating is arranged on a light output side of the organic electroluminescent diode display panel.

An embodiment of the present invention provides a stereoscopic display device; the stereoscopic display device comprises a display panel and a grating, wherein the display panel comprises a plurality of first display units and a plurality of second display units, the plurality of first display units and the plurality of second display units are arranged alternately in a Y direction of the display panel;

the grating comprises a plurality of optical structures arranged parallel to each other; a preset angle β is arranged between the optical structure and an X direction of the display panel, thereby reducing Moire fringe phenomenon during displaying. In particular, in one aspect, to realize stereoscopic displaying, the display panel comprises a plurality of first display units for displaying left eye images and a plurality of second display units for displaying right eye images. The plurality of first display units and the plurality of second display units are arranged alternately in a vertical direction of the display panel, therefore the left eye images and the right eye images can be separated with the effect of the grating. Each first display unit and each second display unit respectively comprises m sub pixels arranged in the Y direction. T is a sub pixels number of a layout position difference in the Y direction between two first display units respectively positioned in two adjacent columns, or a sub pixels number of a layout position difference in the Y direction between two second display units respectively positioned in two adjacent columns, T being a positive integer of 1~100. Moreover, to reduce Moire fringe, the grating comprises a plurality of optical structures arranged parallel to each other; a preset angle β is arranged between the optical structure and an X direction of the display panel; 0.8θ≤β≤1.2θ; and $$\theta = \arctan\left[\left(\frac{T}{m} + \frac{1}{2\times m}\right)\text{Pixel}\right].$$

The preset angle β can be determined with T, therefore the probability of forming Moire fringes is reduced, which Moire fringes are formed by interference between light passing through the grating with the preset angle and light passing through the black matrix. In another aspect, a size of the sub pixel in the Y direction is smaller than a size of the sub pixel in the X direction, therefore the display device is a vertical screen display device. To sum up, for a vertical screen display device, when viewed in a horizontal direction, with the layout position in the embodiments of the present invention, 3D displaying with separated left eye images and right eye images can be realized; moreover, a slant angle for reducing Moire fringes can also be determined, thereby reducing Moire fringe phenomenon during displaying of a naked eye 3D display device.

BRIEF DESCRIPTION OF THE DRAWINGS

In order to more clearly illustrate the technical solutions in embodiments of the invention or in the prior art, the appended drawings needed to be used in the description of the embodiments or the prior art will be introduced briefly in the following. Obviously, the drawings in the following description are only some embodiments of the invention, and for those of ordinary skills in the art, other drawings may be obtained according to these drawings under the premise of not paying out creative work.

REFERENCE SIGNS

10—display panel; 11—grating; 111—slit; 110—optical structure; 12—black matrix; a-c—diagonal dark state; a-b—horizontal dark state; b-c—vertical dark state; 20, 20', 20"—first display unit; 21—second display unit; 202—sub pixel.

DETAILED DESCRIPTION OF THE INVENTION

In the following, the technical solutions in embodiments of the invention will be described clearly and completely in connection with the drawings in the embodiments of the invention. Obviously, the described embodiments are only part of the embodiments of the invention, and not all of the embodiments. Based on the embodiments in the invention, all other embodiments obtained by those of ordinary skills in the art under the premise of not paying out creative work pertain to the protection scope of the invention.

Figure 1A:
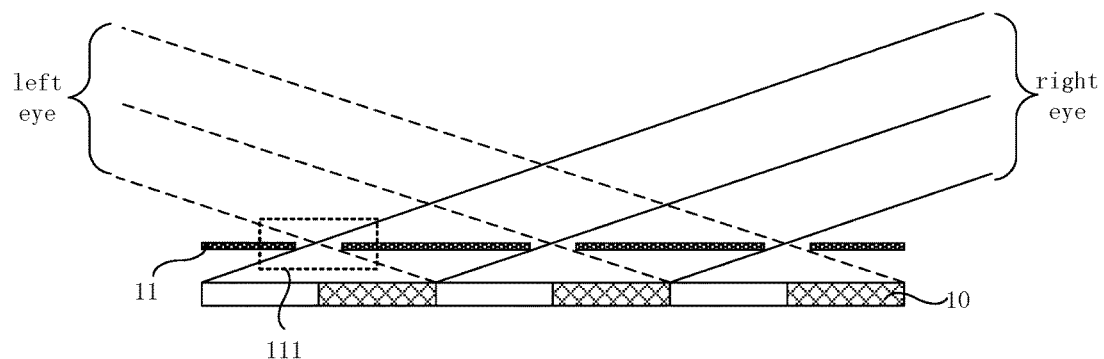
FIG. 1a is a structural schematic diagram of a stereoscopic display device in the prior art.
Figure 1B:
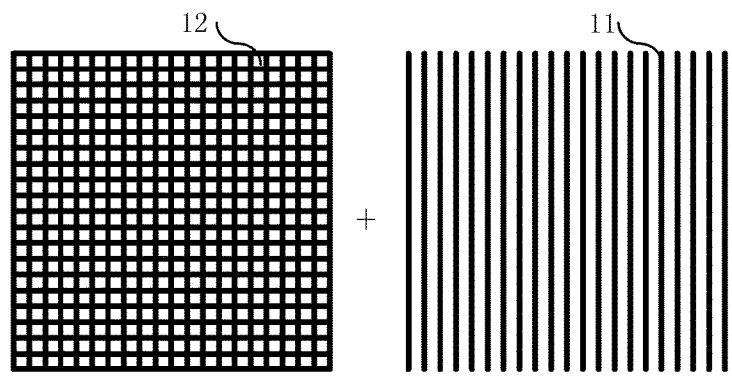
FIG. 1b is a schematic diagram of forming Moire fringes in the prior art.
Figure 1C:
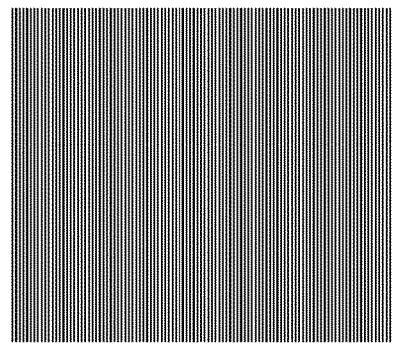
FIG. 1c is a schematic diagram of Moire fringes in the prior art.
Figure 2A:
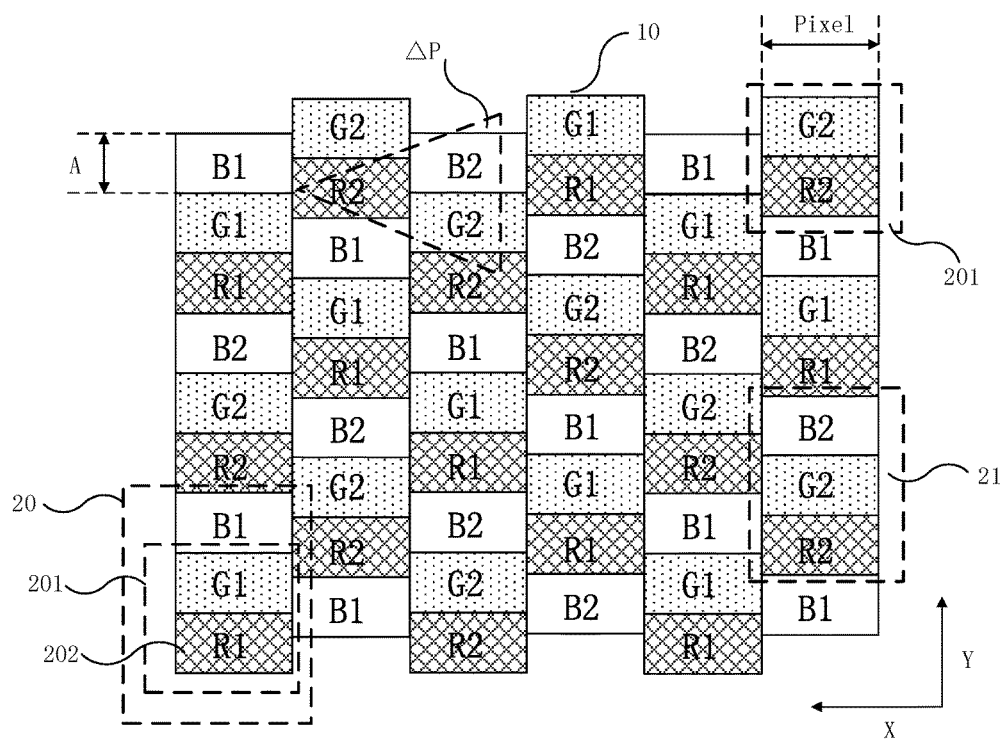
FIG. 2a is a schematic diagram of a pixel arrangement in a display panel provided by an embodiment of the present invention.
Figure 2B:
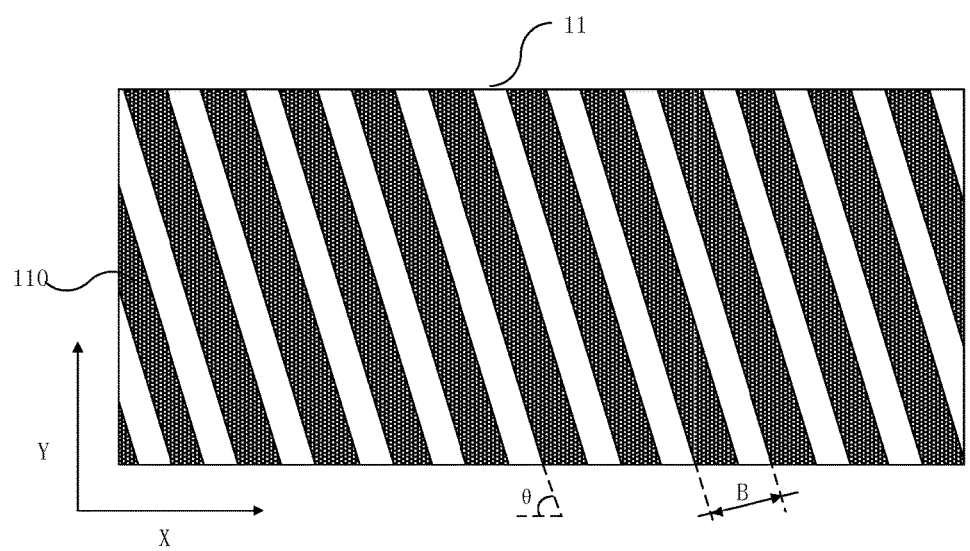
FIG. 2b is a structural schematic diagram of a slit grating provided by an embodiment of the present invention.
Figure 2C:
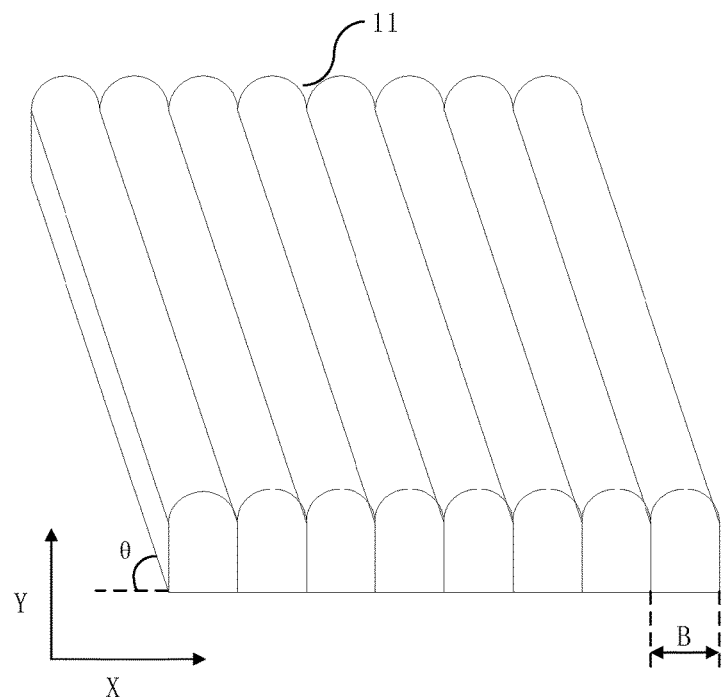
FIG. 2c is a structural schematic diagram of a lenticular grating provided by an embodiment of the present invention.

An embodiment of the present invention provides a stereoscopic display device; the stereoscopic display device can comprise a display panel 10 shown in FIG. 2a and a grating 11 shown in FIG. 2b or FIG. 2c. The grating 11 can be a slit grating shown in FIG. 2b or a lenticular grating shown in FIG. 2c, which is not limited herein. The following embodiments are described taking a slit grating for example.

Furthermore, as shown in FIG. 2a, the display panel 10 can comprise a plurality of first display units 20 and a plurality of second display units 21, the plurality of first display units 20 and the plurality of second display units 21 are arranged alternately in a Y direction of the display panel 10; wherein "a plurality of" means at least one.

Moreover, as shown in FIG. 2b, the grating 11 comprises a plurality of optical structures 110 arranged parallel to each other; a preset angle β is arranged between the optical structure 110 and an X direction of the display panel 10, thereby reducing Moire fringe phenomenon during displaying.

Optionally, each first display unit 20 and each second display unit 21 respectively comprises m sub pixels 202 arranged in the Y direction of the display panel;

wherein m≥1; a size of the sub pixel 202 in the Y direction is smaller than a size of the sub pixel 202 in the X direction, the Y direction being perpendicular to the X direction;

0.8θ≤β≤1.2θ;

wherein $$\theta = \arctan\left[\left(\frac{T}{m} + \frac{1}{2 \times m}\right) \text{Pixel}\right]; \quad (1)$$

Wherein T is a sub pixels number (i.e., number of sub pixels 202) of a layout position difference in the Y direction between two first display units 20 respectively positioned in two adjacent columns, or a sub pixels number of a layout position difference in the Y direction between two second display units 21 respectively positioned in two adjacent columns, T being a positive integer of 1~100;

Moreover, Pixel is the size of the sub pixel 202 in the X direction.

It should be noted that: firstly, to realize 3D displaying, the plurality of first display units and the plurality of second display units are used for displaying different images. For example, the first display units can be used for displaying a first image, and the second display units can be used for displaying a second image. In such a manner, the first image and the second image can be separated with the effect of the grating 11; therefore, the first image displayed by the first display units 20 can be identified by left eye and presents a left eye image, and the second image displayed by the second display units 21 can be identified by right eye and presents a right eye image. When the left eye image and the right eye image are fused by the viewer, a 3D image can then be obtained.

Figure 3:
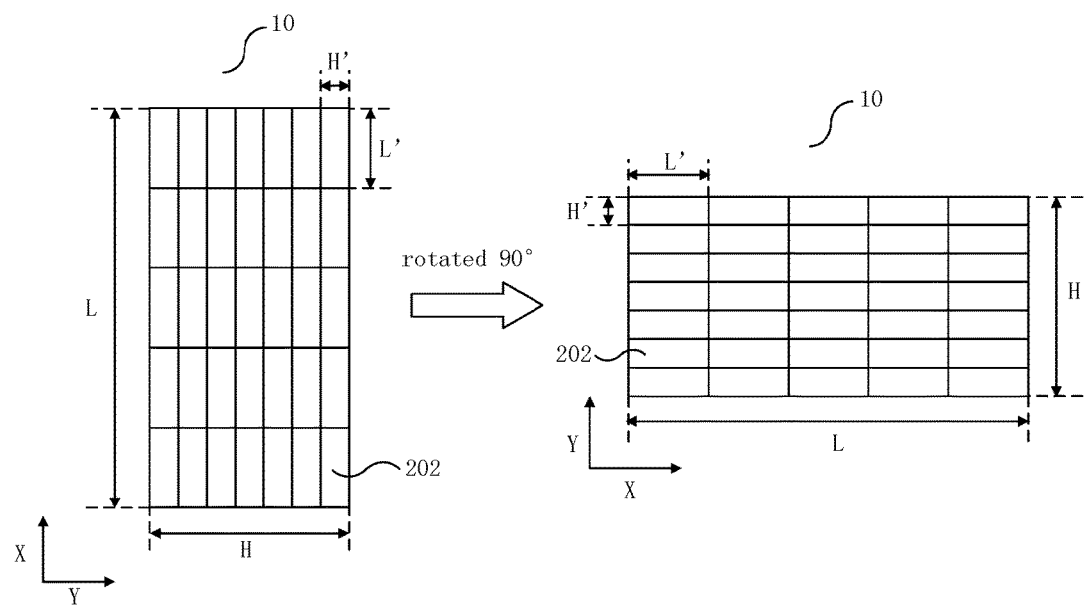
FIG. 3 is a schematic diagram of a vertical screen display device provided by an embodiment of the present invention, which is viewed in a horizontal direction.

Secondly, the horizontal X direction of the display panel is perpendicular to the vertical Y direction of the display panel; the abovementioned horizontal X direction and vertical Y direction are relative concepts. In particular, as shown in FIG. 3, the display panel 10 on the left side is a vertical screen display panel. The vertical screen display panel can be a small display such as a cell phone, a tablet, and so on. Since the size H of the display panel 10 in the Y direction (the horizontal direction in the left drawing) is less than the size L of the display panel 10 in the X direction (the vertical direction in the left drawing), the size H' of the sub pixel 202 on the display panel 10 in the Y direction is smaller than the size L' of the sub pixel 202 in the X direction.

When users are watching the display panel, in order to match the video data and display panel pixel, this vertical screen display can be rotated 90 degrees; i.e., the display panel can be viewed in a placement mode of the right display panel 10 shown in FIG. 3, so as to avoid image distortion and improve the display effect. Then, the size H of the display panel 10 in the Y direction (the vertical direction in the right drawing) is less than the size L of the display panel 10 in the X direction (the horizontal direction in the right drawing). This viewing mode is to view a vertical screen display device in a horizontal direction. Therefore, for a vertical screen display viewed in a horizontal direction, the vertical size H' of the sub pixel 202 is smaller than the horizontal size L' of the sub pixel 202. The following embodiments are described taking a vertical screen display viewed in a horizontal direction for example. Therefore, the X direction (horizontal direction) of the following display panel 10 is coincident with a direction of the long side (L); the Y direction (vertical direction) of the following display panel 10 is coincident with a direction of the short side (H).

Thirdly, the abovementioned preset angles β and θ are illustrated by taking an acute angle between the optical structure 110 and the horizontal X direction of the display panel 10 for example. Wherein the angle θ means: when T is determined, the arrangement positions of the sub pixels 202 are determined; in such a situation, a reference value (i.e., θ) of the slant angle of the grating 11 can then be obtained with the formula (1), the reference value being one-to-one corresponding to T. When a preset angle β is smaller than 0.8θ, or greater than 1.2θ, a serious crosstalk will occur between the first image displayed by the first display units 20 and the second image displayed by the second display units 21, and a crosstalk will occur between the left eye image and right eye image received by human eyes, reducing the effect of stereoscopic displaying. Therefore, the range of the preset angle β can be 0.8θ≤β≤1.2θ, optionally β=θ.

Fourthly, T can be a number of non overlapping sub pixels 202 between two first display units 20 (or, between two second display units 21) respectively positioned in two adjacent columns.

Figure 4A:
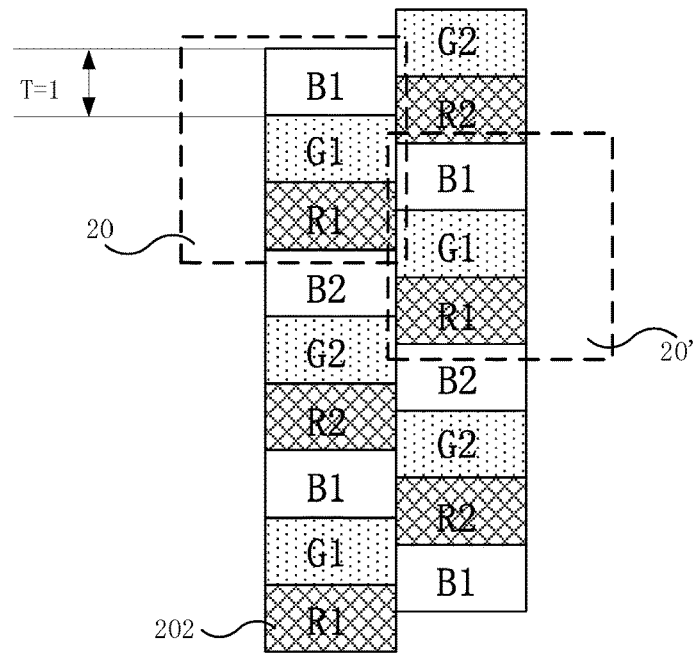
FIG. 4a is a schematic diagram of a pixel arrangement provided by an embodiment of the present invention.

For example, as shown in FIG. 4a, there is a layout position difference of one sub pixel B1 between a first display unit 20 and a first display unit 20' respectively positioned in two adjacent columns. In particular, there is only one non overlapping sub pixel 202 between the first display unit 20 and the first display unit 20', i.e., the sub pixel B1 in the first display unit 20; therefore T=1.

Figure 4B:
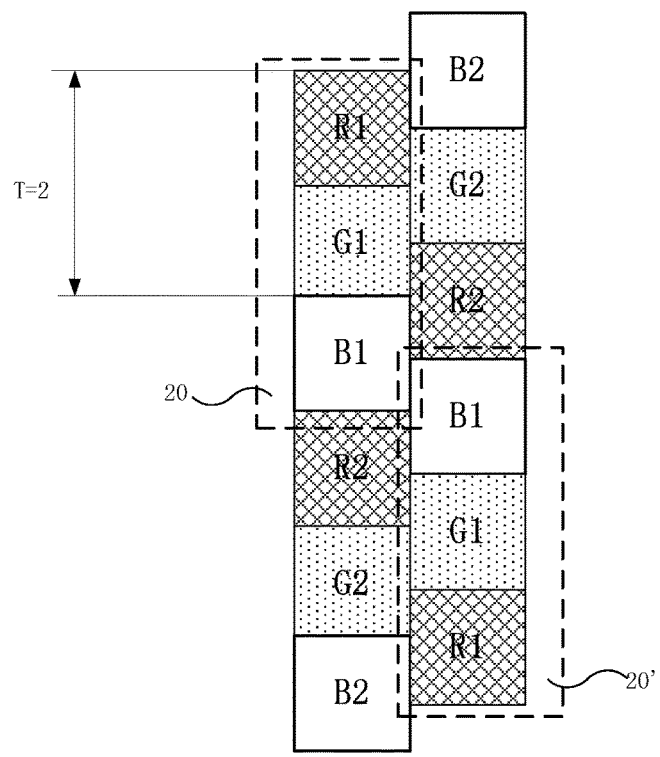
FIG. 4b is a schematic diagram of another pixel arrangement provided by an embodiment of the present invention.

For another example, as shown in FIG. 4b, there is a layout position difference of two sub pixels (R1 and G1) between a first display unit 20 and a first display unit 20' respectively positioned in two adjacent columns. In particular, there are two non overlapping sub pixels between the first display unit 20 and the first display unit 20', i.e., the sub pixels R1 and G1 in the first display unit 20; therefore T=2.

Other values of T can then be obtained in a similar way, which is not repeated herein.

By arranging the sub pixels 202 with the abovementioned layout position difference, a Delta pixel ΔP can then be obtained, realizing sharing of the sub pixels 202. For example, in FIG. 2a, the sub pixel R2 in the Delta pixel ΔP can not only realize primary colors (RGB) display with the sub pixels B2 and G2 in the Delta pixel ΔP, but also can realize primary colors (RGB) display with the sub pixel G2 located in the same column and a sub pixel B2 (not shown in the drawing). Since the displaying positions are different during the sharing of the sub pixels 202, the resolution of the display panel can then be increased. For a small display device, the size of the display panel is limited, therefore a small display device having a high resolution can be realized with the abovementioned method.

Fifthly, the size Pixel of the sub pixel 202 in the X direction is illustrated below. In the actual production process, in order to facilitate the production processing, as shown in FIG. 4b, one sub pixel 202 can be formed as one square; or, as shown in FIG. 4a, two sub pixels 202 can be formed as one square; or, three or four sub pixels 202 can be formed as one square. In such a situation, the size Pixel of the sub pixel 202 in the X direction can be any side of the square; then, if one sub pixel 202 is formed as one square, the size of the sub pixel 202 in the Y direction A=Pixel; when two sub pixels 202 are formed as one square, A=½*Pixel; when three sub pixels 202 are formed as one square, A=⅓*Pixel. The values of A are illustrated with the above examples, other values of A are not repeated herein.

Sixthly, the sub pixel 202 can be a red sub pixel, a blue sub pixel or a green sub pixel, such that the stereoscopic display device can perform displaying with primary colors (RGB) display technique. Base on this, the sub pixel 202 can be a yellow sub pixel (Y), such that the stereoscopic display device can perform displaying with RGBY display technique. Additionally, the sub pixel 202 can be a white sub pixel (W), such that the stereoscopic display device can perform displaying with RGBW display technique.

Seventhly, depending on the display panel 10, the grating can be located in different positions with respect to the display panel 10. For example, if the display panel 10 is a liquid crystal display panel, since a backlight module providing light is arranged on a light input side of the liquid crystal display panel, the grating 11 can be arranged either on the light input side or on a light output side of the liquid crystal display panel, realizing the effect of 3D displaying. For example, if the display panel 10 is an organic electroluminescent diode display panel, the display panel per se can emit light, no backlight being required, and then the grating 11 can only be arranged on a light output side of the organic electroluminescent diode display panel to realize 3D displaying.

An embodiment of the present invention provides a stereoscopic display device; the stereoscopic display device comprises a display panel and a grating. In one aspect, to realize stereoscopic displaying, the display panel comprises a plurality of first display units for displaying left eye images and a plurality of second display units for displaying right eye images. The plurality of first display units and the plurality of second display units are arranged alternately in a vertical direction of the display panel, therefore the left eye images and the right eye images can be separated with the effect of the grating. Each first display unit and each second display unit respectively comprises m sub pixels arranged in the Y direction. T is a sub pixels number of a layout position difference in the Y direction between two first display units respectively positioned in two adjacent columns, or a sub pixels number of a layout position difference in the Y direction between two second display units respectively positioned in two adjacent columns, T being a positive integer of 1~100. Moreover, to reduce Moire fringe, the grating comprises a plurality of optical structures arranged parallel to each other; a preset angle β is arranged between the optical structure and an X direction of the display panel; 0.8θ≤β≤1.2θ; and $$\theta = \arctan\left[\left(\frac{T}{m} + \frac{1}{2 \times m}\right) \text{Pixel}\right].$$

The preset angle β can be determined with T, therefore the probability of forming Moire fringes is reduced, which Moire fringes are formed by interference between light passing through the grating with the preset angle and light passing through the black matrix. In another aspect, a size of the sub pixel in the Y direction is smaller than a size of the sub pixel in the X direction, therefore the display device is a vertical screen display device. To sum up, for a vertical screen display device, when viewed in a horizontal direction, with the layout position in the embodiments of the present invention, 3D displaying with separated left eye images and right eye images can be realized; moreover, a slant angle for reducing Moire fringes can also be determined, thereby reducing Moire fringe phenomenon during displaying of a naked eye 3D display device.

Figure 5:
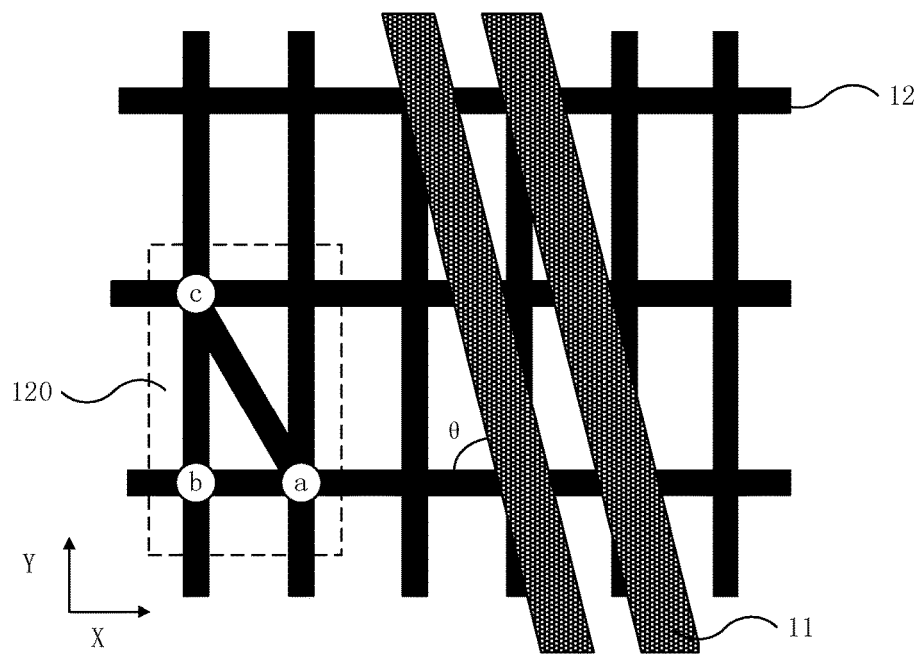
FIG. 5 is another schematic diagram of forming Moire fringes provided by an embodiment of the present invention.

From the prior art, it can be understood that Moire fringes are formed due to alternative bright and dark stripes caused by the superposition of light passing through the black matrix 12 and light passing through the grating 11. As shown in FIG. 5, in microscopic state, the criss-cross black matrix 12 can form a plurality of rectangular frames 120 arranged in a matrix form; the size of each rectangular frame 120 matches the size of one sub pixel 202.

However, if viewed from a macro perspective, in the rectangular frames 120, the black matrix 12 can have three directional dark states, which comprise a horizontal dark state in the horizontal direction formed by point a and point b, a vertical dark state in the vertical direction formed by point b and point c, and a diagonal dark state in a diagonal direction of the rectangular frame 120 formed by point a and point c. Therefore, to reduce Moire fringes, the Moire fringes formed in the horizontal dark state (a-b), in the vertical dark state (b-c), and in the diagonal dark state (a-c) of the grating 11 and the black matrix 12 should be eliminated. In the following, the methods of eliminating Moire fringes in different dark states are described in detail with specific embodiments.

Embodiment 1

To eliminate Moire fringes formed between the diagonal dark state (a-c) of the black matrix 12 and the grating 11, θ between the grating 11 and the X direction of the display panel 10 should meet the formula:

$$|\alpha - \theta| > \arccos\frac{P^2\left[n^2\left(\frac{A}{3} \times \sin\alpha\right)^2 + B^2\right] - \left(\frac{A}{2} \times \sin\alpha\right)^2 B^2}{2n\left(\frac{A}{3} \times \sin\alpha\right)BP^2}; \quad (2)$$

wherein α is an angle between a diagonal of the sub pixel 202 and the Y direction.

In particular, as shown in FIG. 4b, when one sub pixel 202 is formed as one square, the diagonal of the sub pixel 202 is the diagonal of the square; an angle α of 45° is formed between the diagonal and the Y direction.

For another example, as shown in FIG. 4a, when two sub pixels 202 are formed as one square, an angle $$\alpha = \arctan\frac{\text{Pixel}}{\text{Pixel}/2} = \arctan 2 = 63.43°$$

is formed between the diagonal of the sub pixel 202 and the Y direction.

Similarly, when three sub pixels 202 are formed as one square, an angle $$\alpha = \arctan\frac{\text{Pixel}}{\text{Pixel}/3} = \arctan 3 = 71.56°$$

is formed between the diagonal of the sub pixel 202 and the Y direction.

Other values of α can be obtained in a similar way, which are not repeated herein.

Additionally, A is the size of the sub pixel 202 in the Y direction;

P is a width of the smallest Moire fringe which can be identified by human eyes;

B is a grating pitch of the grating 11, as shown in FIG. 2b or FIG. 2c; and n is a sampling number for Moire fringes, being a positive integer.

The sampling for Moire fringes is described below in detailed.

Figure 6:
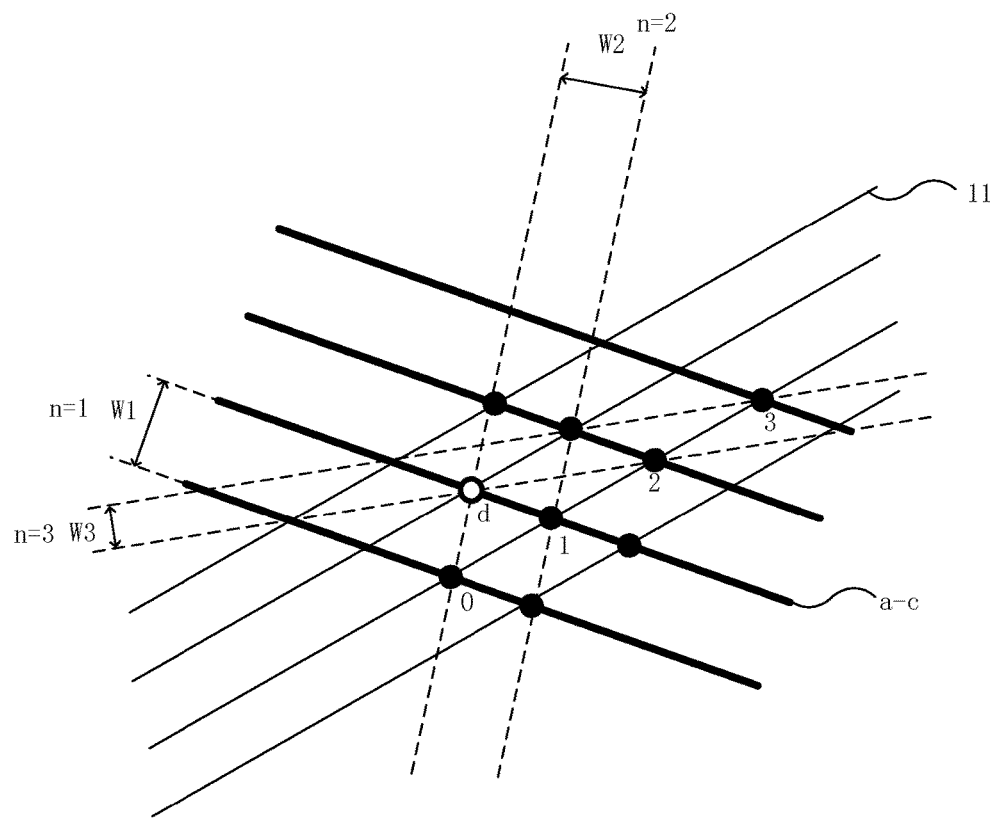
FIG. 6 is a schematic diagram of forming Moire fringes between a black matrix dark state and a grating provided by an embodiment of the present invention.

From abovementioned description, it can be understood that Moire fringes can be formed with superposition of different dark states of the black matrix 12 and the gratin 11. In particular, as shown in FIG. 6, there are multiple intersection points (indicated with dots) between the diagonal dark state (a-c) of the black matrix 12 and the grating 11. Several (0, 1, 2, 3 . . . ) sampling points are selected from these intersection points to sample the Moire fringes. There is a Moire fringe with a certain width between each sampling point and a fixed point d (an intersection point adjacent to the sampling point).

For example, when the sampling number n=1, the Moire fringe formed between the fixed point d and the sampling point 0 can be sampled, obtaining a Moire fringe with a width W1 between the fixed point d and the sampling point 0; when the sampling number n=2, the Moire fringe formed between the fixed point d and the sampling point 1 can be sampled, obtaining a Moire fringe with a width W2 between the fixed point d and the sampling point 1; when the sampling number n=3, the Moire fringe formed between the fixed point d and the sampling point 2 can be sampled, obtaining a Moire fringe with a width W3 between the fixed point d and the sampling point 2. Similarly, by increasing the sampling number, Moire fringes with different widths between the fixed point d and the sampling points 4, 5 . . . , n can be obtained, which are not repeated herein.

Since formula (2) is related to the sampling number n, a sampling number of n can be used for calculating n individual values of θ, so as to obtain a first range of the angle. In such a manner, if θ is within the first range of the angle, the Moire fringe formed between the diagonal dark state (a-c) of the black matrix 12 and the grating 11 can be eliminated.

Embodiment 2

Figure 7:
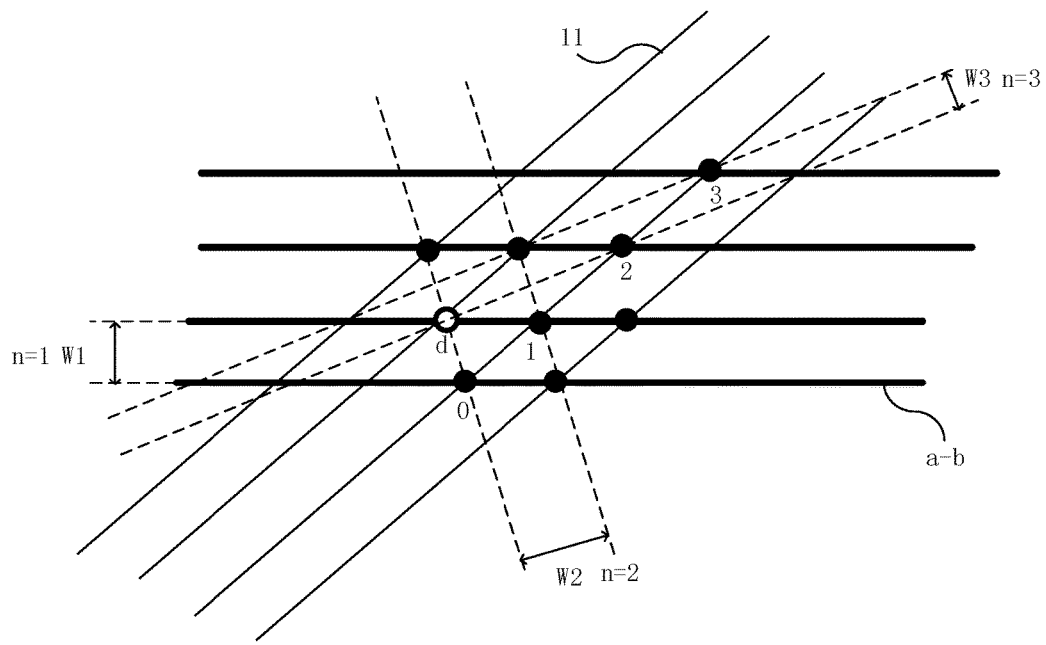
FIG. 7 is another schematic diagram of forming Moire fringes between a black matrix dark state and a grating provided by an embodiment of the present invention.
Figure 8:
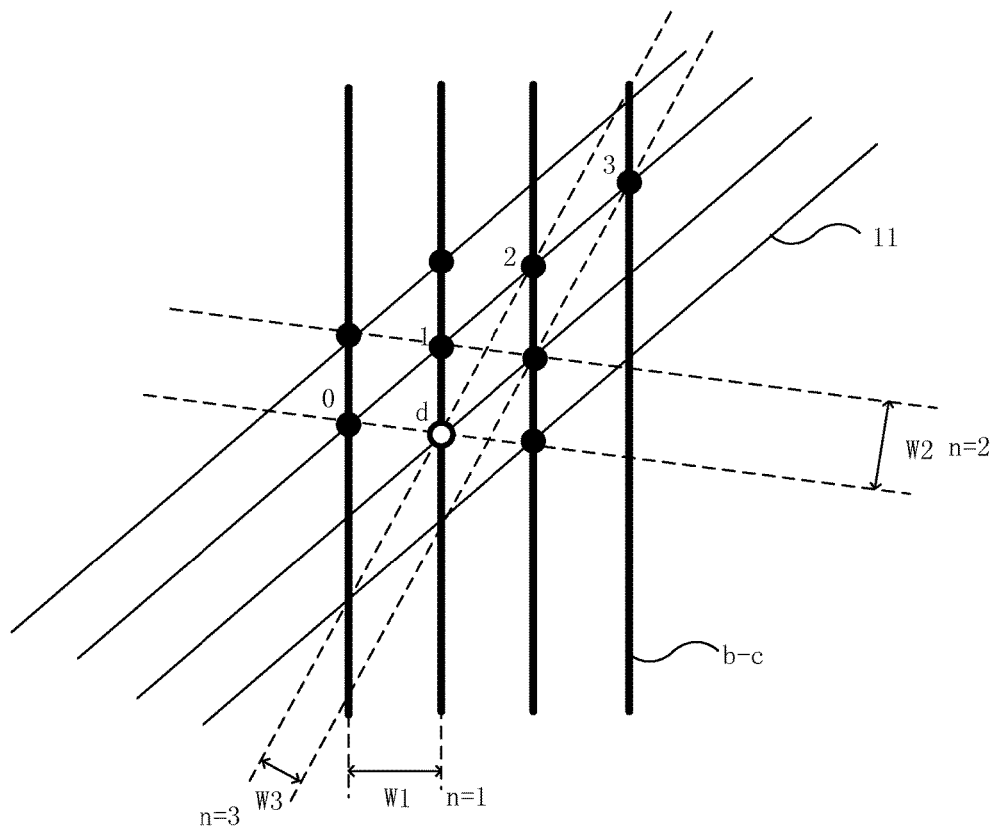
FIG. 8 is yet another schematic diagram of forming Moire fringes between a black matrix dark state and a grating provided by an embodiment of the present invention.

To eliminate Moire fringes formed between the horizontal dark state (a-b) of the black matrix 12 and the grating 11, θ between the grating 11 and the X direction of the display panel 10 should meet the formula:

$$\theta > \arccos\frac{P^2(n^2A^2+B^2)-A^2B^2}{2nABP^2}; \quad (3)$$

wherein the sampling process for the Moire fringes is shown in FIG. 7. There are multiple intersection points (indicated with dots) between the horizontal dark state (a-b) of the black matrix 12 and the grating 11. Several (0, 1, 2, 3 . . . ) sampling points are selected from these intersection points to sample the Moire fringes. There is a Moire fringe with a certain width between each sampling point and a fixed point d (an intersection point adjacent to the sampling point).

For example, when the sampling number n=1, the Moire fringe formed between the fixed point d and the sampling point 0 can be sampled, obtaining a Moire fringe with a width W1 between the fixed point d and the sampling point 0; when the sampling number n=2, the Moire fringe formed between the fixed point d and the sampling point 1 can be sampled, obtaining a Moire fringe with a width W2 between the fixed point d and the sampling point 1; when the sampling number n=3, the Moire fringe formed between the fixed point d and the sampling point 2 can be sampled, obtaining a Moire fringe with a width W3 between the fixed point d and the sampling point 2. Similarly, by increasing the sampling number, Moire fringes with different widths between the fixed point d and the sampling points 4, 5 . . . , n can be obtained, which are not repeated herein.

Since formula (3) is related to the sampling number n, a sampling number of n can be used for calculating n individual values of θ, so as to obtain a second range of the angle. In such a manner, if θ is within the second range of the angle, the Moire fringe formed between the horizontal dark state (a-b) of the black matrix 12 and the grating 11 can be eliminated.

Embodiment 3

To eliminate Moire fringes formed between the vertical dark state (b-c) of the black matrix 12 and the grating 11, θ between the grating 11 and the X direction of the display panel 10 should meet the formula:

$$\theta < 90° - \arccos\frac{P^2(n^2A^2/9+B^2)-A^2B^2/9}{2nABP^2/3}; \quad (4)$$

wherein the sampling process for the Moire fringes is shown in FIG. 7. There are multiple intersection points (indicated with dots) between the vertical dark state (b-c) of the black matrix 12 and the grating 11. Several (0, 1, 2, 3 . . . ) sampling points are selected from these intersection points to sample the Moire fringes. There is a Moire fringe with a certain width between each sampling point and a fixed point d (an intersection point adjacent to the sampling point).

For example, when the sampling number n=1, the Moire fringe formed between the fixed point d and the sampling point 0 can be sampled, obtaining a Moire fringe with a width W1 between the fixed point d and the sampling point 0; when the sampling number n=2, the Moire fringe formed between the fixed point d and the sampling point 1 can be sampled, obtaining a Moire fringe with a width W2 between the fixed point d and the sampling point 1; when the sampling number n=3, the Moire fringe formed between the fixed point d and the sampling point 2 can be sampled, obtaining a Moire fringe with a width W3 between the fixed point d and the sampling point 2. Similarly, by increasing the sampling number, Moire fringes with different widths between the fixed point d and the sampling points 4, 5 . . . , n can be obtained, which are not repeated herein.

Since formula (4) is related to the sampling number n, a sampling number of n can be used for calculating n individual values of θ, so as to obtain a third range of the angle. In such a manner, if θ is within the third range of the angle, the Moire fringe formed between the vertical dark state (b-c) of the black matrix 12 and the grating 11 can be eliminated.

In conclusion, the intersection of the first range of the angle, the second range of the angle and the third range of the angle forms a fourth range of the angle. In such a manner, θ within the fourth range of the angle meets formulas (2), (3) and (4) simultaneously. Therefore, if θ is within the fourth range of the angle, the Moire fringe formed between the horizontal dark state (a-b), vertical dark state (b-c), diagonal dark state (a-c) of the black matrix 12 and the grating 11 can be eliminated, thereby greatly improving the effect of eliminating Moire fringe.

The following is an embodiment, in which θ within the fourth range of the angle is applied for the grating 11, taking a 4.7 inch display applying Delta pixel arrangement for example, so as to illustrate a stereoscopic display device capable of eliminating Moire fringe in detail.

Embodiment 4

For a 4.7 inch display, it is known that the pitch of the abovementioned square is 0.05418 mm; if two sub pixels 202 form a square, the size of the sub pixel 202 in the Y direction is A=P/2. Moreover, the width of the smallest Moire fringe which can be identified by human eyes is 0.291 mm. The above values and the sampling number for Moire fringe n=1, 2, 3 . . . 100 are brought into formulas (2), (3) and (4) respectively, calculating $\theta_1, \theta_2, \theta_3 \ldots \theta_{100}$. Then, the fourth range of the angle θ is: 15.9°<θ<62.5°, and 82.9°>θ>73.7°.

In this embodiment, $$\theta = \arctan\left[\left(\frac{T}{m} + \frac{1}{2 \times m}\right) \text{Pixel}\right],$$

and two sub pixels 202 form a square. Therefore, m=2 is brought into the formula of θ:

$$\theta = \arctan\left[\left(\frac{T}{2} + 0.25\right) \text{Pixel}\right] \qquad (5)$$

15.9°<θ<62.5° and 82.9°>θ>73.7° are brought into formula (5), then the positive integer T can be calculated as T=1, 2, 3, 7, 8, 9, 10, 11, 12, 13, 14, 15, 16.

When T=1, the arrangement of the sub pixels 202 is shown in FIG. 4a; there is a layout position difference of one sub pixel B1 between a first display unit 20 and a first display unit 20' respectively positioned in two adjacent columns. In particular, there is only one non overlapping sub pixel 202 between the first display unit 20 and the first display unit 20', i.e., the sub pixel B1 in the first display unit 20; therefore T=1.

Figure 9:
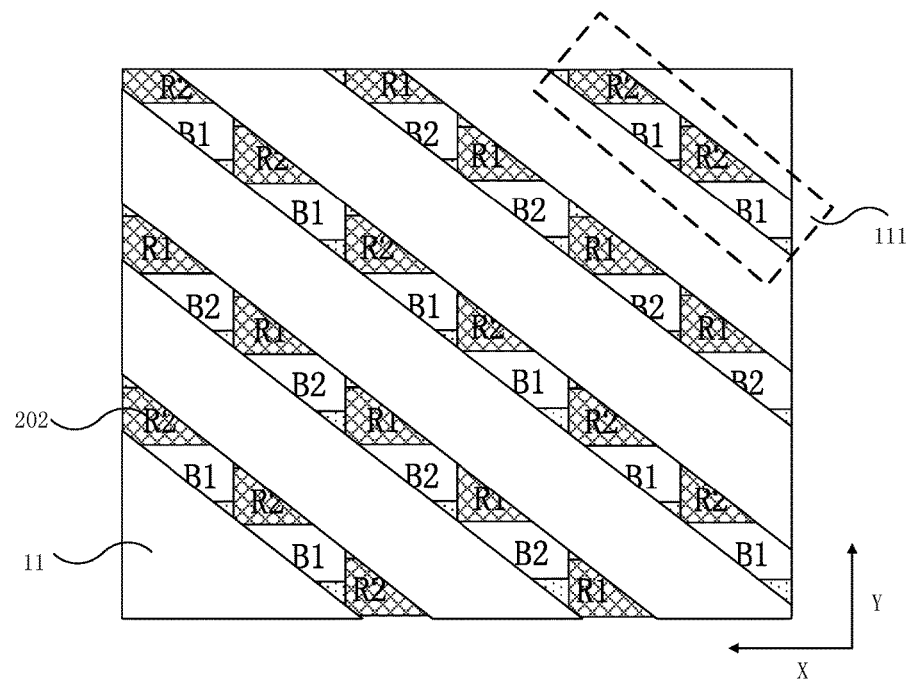
FIG. 9 is a structural schematic diagram of a stereoscopic display device provided by an embodiment of the present invention.

The slant angle of the grating 11 is then adjusted with θ corresponding to T=1. FIG. 9 shows the matching of the pixel layout and the grating 11 with the adjusted angle. It can be seen that in a transparent region 111 of the grating 11, the sub pixels R1, B1 and G1 belonging to the first display unit 20 occupy half of the transparent region; the sub pixels R2, B2 and G2 belonging to the second display unit 21 also occupy half of the transparent region; moreover, the transparent region only covers a small part of a sub pixel 202. Therefore, the first image displayed by the first display units 20 and the second image displayed by the second display units 21 can be separated with the separating effect of the grating 11; the first image can be identified by left eye and presents a left eye image, and the second image can be identified by right eye and presents a right eye image. When the left eye image and the right eye image are fused by the viewer, a 3D image can then be obtained.

Therefore, in an aspect, with the above mentioned pixel arrangement, in a transparent region, the sub pixels from the first display unit 20 and the sub pixels from the second display unit 21 are distributed uniformly, and the transparent region 111 only covers a small part of a sub pixel 202; then there is a small crosstalk between the first image and the second image. In another aspect, the slant angle of the grating 11 meets formulas (2), (3) and (4), then the Moire fringe formed between the respective dark state of the black matrix 12 and the grating 11 can be eliminated.

Figure 10A:
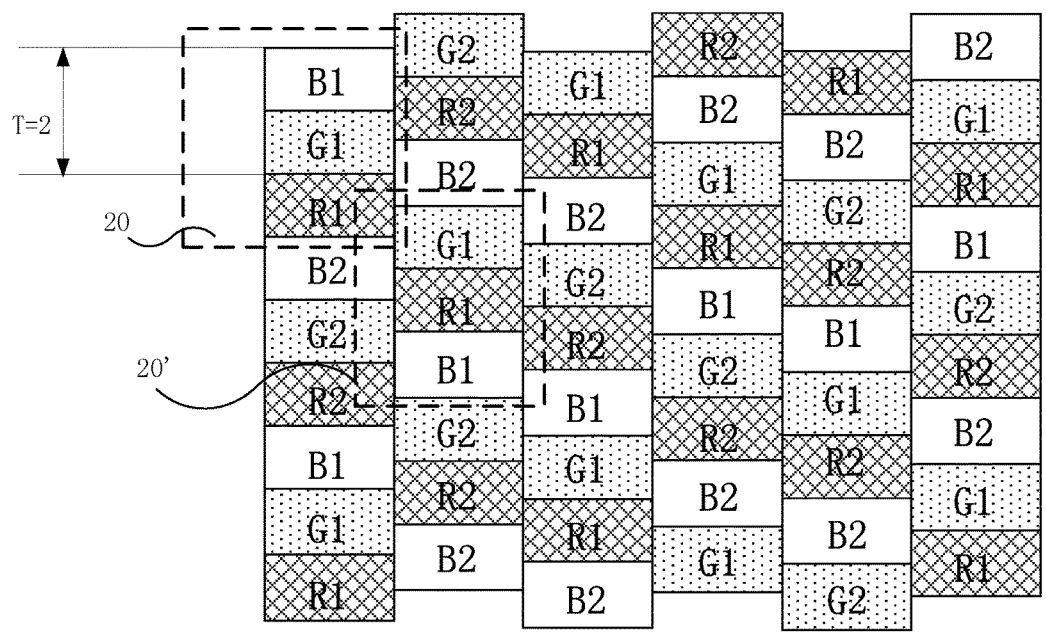
FIG. 10a is another schematic diagram of a pixel arrangement provided by an embodiment of the present invention.

When T=2, the arrangement of the sub pixels 202 is shown in FIG. 10a; there is a layout position difference of two sub pixels B1 and G1 between a first display unit 20 and a first display unit 20' respectively positioned in two adjacent columns. In particular, there are two non overlapping sub pixels between the first display unit 20 and the first display unit 20', i.e., the sub pixels B1 and G1 in the first display unit 20; therefore T=2.

Figure 10B:
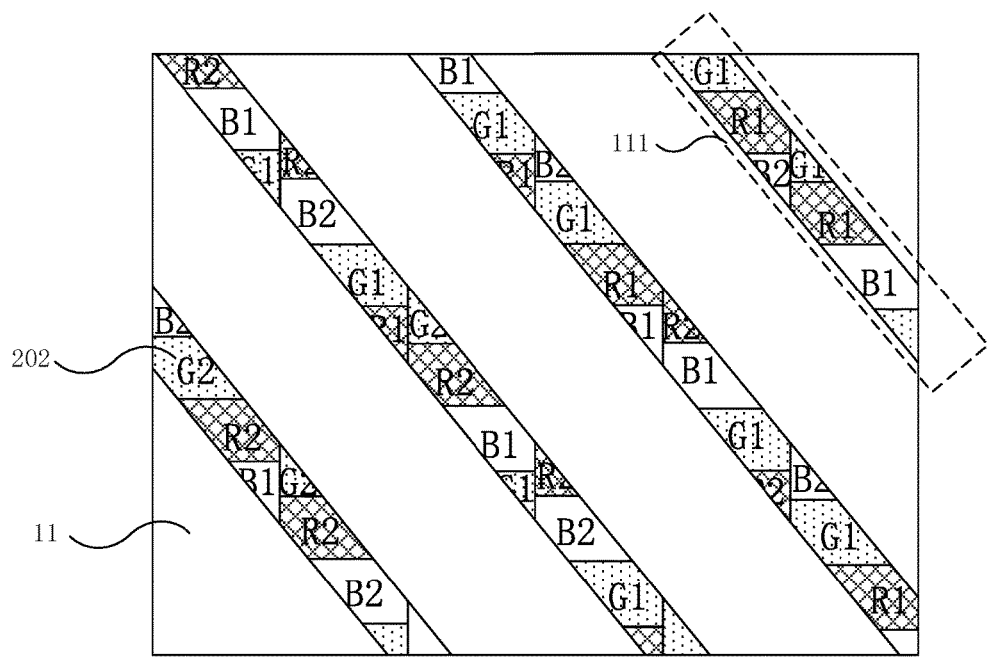
FIG. 10b is another structural schematic diagram of a stereoscopic display device provided by an embodiment of the present invention.

The slant angle of the grating 11 is then adjusted with θ corresponding to T=2. FIG. 10b shows the matching of the pixel layout and the grating 11 with the adjusted angle. It can be seen that compared with the solution of T=1, in a transparent region 111 of the grating 11, the number of the sub pixels R1, B1 and G1 belonging to the first display unit 20 is not equal to the number of the sub pixels R2, B2 and G2 belonging to the second display unit 21. In some transparent regions 111, there are more sub pixels 202 belonging to the first display unit 20; while in some transparent regions 111, there are more sub pixels 202 belonging to the second display unit 21; moreover, for some sub pixels 202 (e.g. R1, B1), the transparent region covers the majority of the sub pixel 202. Therefore, most of the light from R1 and B1 is emitted from the transparent region directly, without being separated by the grating 11, thereby increasing the crosstalk area between the first image and the second image. Though the effect of this solution is not good as the solution of T=1, it can still realize 3D displaying without Moire fringe.

Figure 11A:
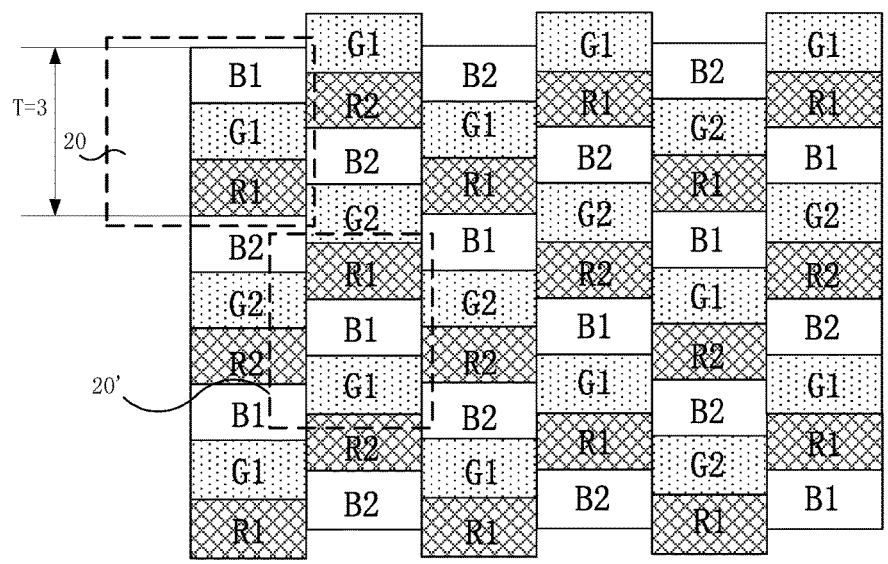
FIG. 11a is yet another schematic diagram of a pixel arrangement provided by an embodiment of the present invention.

When T=3, the arrangement of the sub pixels 202 is shown in FIG. 11a; there is a layout position difference of three sub pixels B1, G1 and R1 between a first display unit 20 and a first display unit 20' respectively positioned in two adjacent columns. In particular, there are three non overlapping sub pixels between the first display unit 20 and the first display unit 20', i.e., the sub pixels B1, G1 and R1 in the first display unit 20; therefore T=3.

Figure 11B:
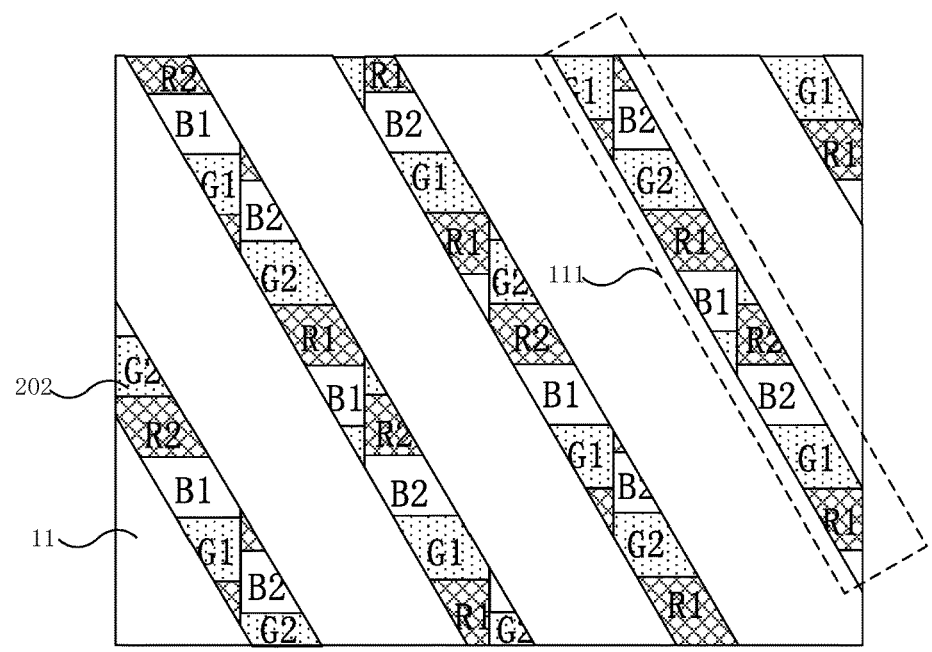
FIG. 11b is yet another structural schematic diagram of a stereoscopic display device provided by an embodiment of the present invention.

The slant angle of the grating 11 is then adjusted with θ corresponding to T=3. FIG. 11b shows the matching of the pixel layout and the grating 11 with the adjusted angle. It can be seen that compared with the solution of T=1, in a transparent region 111 of the grating 11, the number of the sub pixels R1, B1 and G1 belonging to the first display unit 20 is not equal to the number of the sub pixels R2, B2 and G2 belonging to the second display unit 21. In some transparent regions 111, there are more sub pixels 202 belonging to the first display unit 20; while in some transparent regions 111, there are more sub pixels 202 belonging to the second display unit 21; moreover, for some sub pixels 202 (e.g. R1, B1, G2, R2), the transparent region covers the majority of the sub pixel 202. Therefore, most of the light from R1, B1, G2 and R2 is emitted from the transparent region directly, without being separated by the grating 11, thereby increasing the crosstalk area between the first image and the second image. Though the effect of this solution is not good as the solution of T=1, it can still realize 3D displaying without Moire fringe.

Figure 12A:
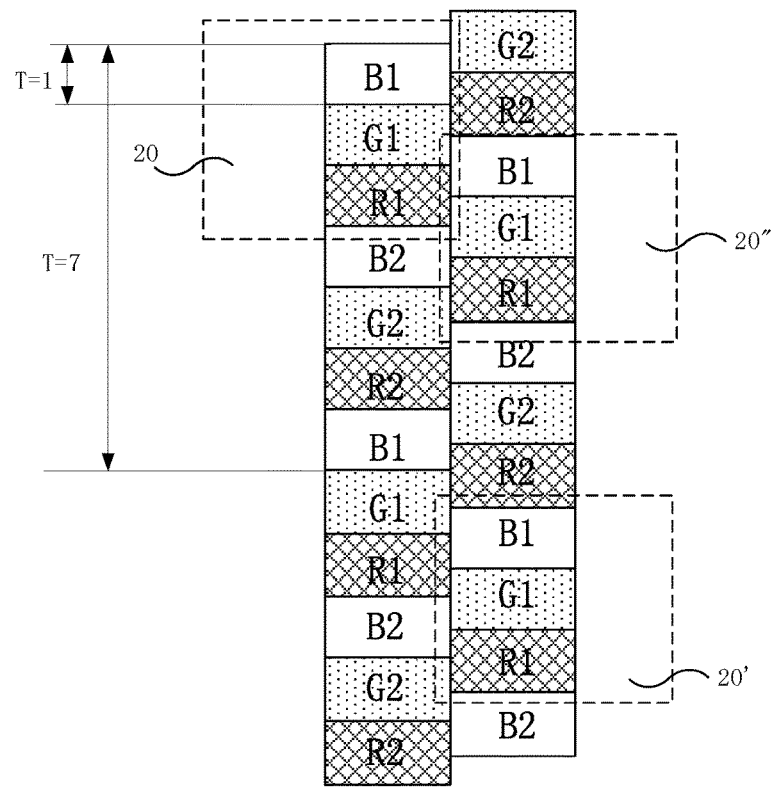
FIG. 12a is still another schematic diagram of a pixel arrangement provided by an embodiment of the present invention.

Similarly, the arrangement of the sub pixels 202 corresponding to T=7 can be obtained, which is shown in FIG. 12a; there is a layout position difference of seven sub pixels B1, G1, R1, B2, G2, R2 and B1 between a first display unit 20 and a first display unit 20' respectively positioned in two adjacent columns. In particular, there are seven non overlapping sub pixels between the first display unit 20 and the first display unit 20', i.e., the sub pixels B1, G1, R1, B2, G2, R2 and B1 in the first display unit 20; therefore T=7.

Figure 12B:
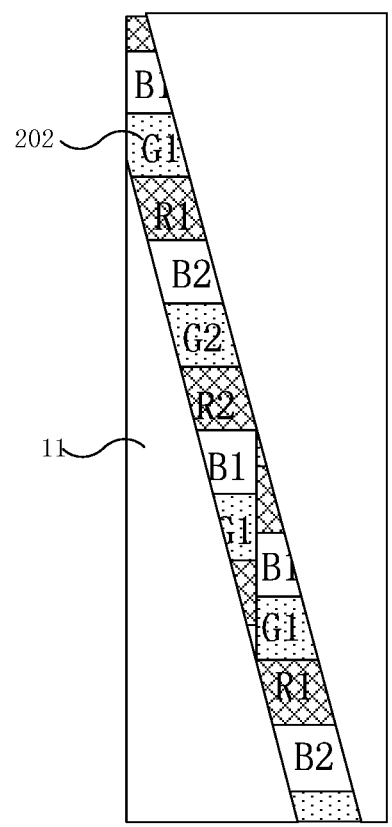
FIG. 12b is still another structural schematic diagram of a stereoscopic display device provided by an embodiment of the present invention.

The slant angle of the grating 11 can also be adjusted with θ corresponding to T=7. FIG. 12b shows the matching of the pixel layout and the grating 11 with the adjusted angle. It can be seen that a transparent region 111 covers most of the sub pixels of the first display unit 20 (R1, B1, G1) and most of the sub pixels of the second display unit 21 (R2, B2, G2), thereby greatly weakening the separating effect of the grating 11 and increasing the crosstalk probability between the first image displayed by the first display unit 20 and the second image displayed by the second display unit 21. Though the solution of T=7 may still reduce Moire fringe, the 3D display image can not be viewed due to a large crosstalk between the left eye image and the right eye image.

It should be noted that FIG. 12a can not only indicate the sub pixel layout of T=1, but also can indicate the sub pixel layout of T=7, since the plurality of first display units 20 and the plurality of second display units 21 are arranged alternately in the Y direction of the display panel 10. For a display device applying primary colors (RGB) display technique, there are three sub pixels B2, G2 and R2 (forming a second display unit 21) between two adjacent first display unit 20 in a same column. Therefore, in the sub pixels of the second column in FIG. 12a, there are 5 sub pixels (G1, R1, B2, G2 and R2) between the first appearing sub pixel B1 and the second appearing sub pixel B1.

That is, there is a layout position difference of three sub pixels B1, G1, R1, B2, G2, R2 and B1 between a first display unit 20 and a second appearing first display unit 20' respectively positioned in two adjacent columns; therefore T=7. Moreover, there is a layout position difference of one sub pixel B1 between a first display unit 20 and a first appearing first display unit 20" respectively positioned in two adjacent columns; therefore T=1. However, from formula (1), it is known that the preset angle β of the grating 11 corresponding to T=1 is different with the preset angle β of the grating 11 corresponding to T=7.

In conclusion, for a display device applying primary colors (RGB) display technique, there are 6 different sub pixel layouts, i.e., the sub pixel layouts corresponding to T=1, 2, 3, 4, 5, 6 and 7 respectively. Moreover, the sub pixel layout of T=7 is same with the sub pixel layout of T=1; the sub pixel layout of T=8 is same with the sub pixel layout of T=2; the sub pixel layout of T=Q is same with the sub pixel layout of T=Q-6. Wherein 6<Q≤100, and Q is a positive integer. Similarly, for a display device applying RGBY or RGBW display technique, there are 8 different sub pixel layouts, i.e., the sub pixel layouts corresponding to T=1, 2, 3, 4, 5, 6, 7 and 8 respectively. Moreover, the sub pixel layout of T=9 is same with the sub pixel layout of T=1; the sub pixel layout of T=10 is same with the sub pixel layout of T=2; the sub pixel layout of T=Q' is same with the sub pixel layout of T=Q'-8. Wherein 8<Q'≤100, and Q' is a positive integer.

In conclusion, in this embodiment, optionally T=1, 2 or 3.

Similarly, if one sub pixel 202 forms a square, m=2 is brought into the formula of θ:

$$\theta = \arctan\left[(T+0.5)\text{Pixel}\right] \quad (6)$$

With a same calculation as Embodiment 4, the value of T in formula (6) is optionally 1, 2 or 3. The specific calculation process is as abovementioned, which is not repeated herein.

An embodiment of the present invention also provides a method for manufacturing a stereoscopic display device; the method comprises providing a display panel and a grating, wherein the display panel comprises a plurality of first display units and a plurality of second display units, the plurality of first display units and the plurality of second display units are arranged alternately in a Y direction of the display panel;

the grating comprises a plurality of optical structures arranged parallel to each other; a preset angle β is arranged between the optical structure and an X direction of the display panel, thereby reducing Moire fringe phenomenon during displaying.

Optionally, each first display unit and each second display unit respectively comprises m sub pixels arranged in the Y direction;

wherein m≥1; a size of the sub pixel in the Y direction is smaller than a size of the sub pixel in the X direction, the Y direction being perpendicular to the X direction;

$$0.8\theta \leq \beta \leq 1.2\theta;$$

wherein $$\theta = \arctan\left[\left(\frac{T}{m} + \frac{1}{2 \times m}\right)\text{Pixel}\right];$$

T is a sub pixels number of a layout position difference in the Y direction between two first display units respectively positioned in two adjacent columns, or a sub pixels number of a layout position difference in the Y direction between two second display units respectively positioned in two adjacent columns, T being a positive integer of 1~100;

Pixel is the size of the sub pixel in the X direction.

Optionally, θ meets:

$$|\alpha - \theta| > \arccos \frac{P^2\left[n^2\left(\frac{A}{3} \times \sin\alpha\right)^2 + B^2\right] - \left(\frac{A}{2} \times \sin\alpha\right)^2 B^2}{2n\left(\frac{A}{3} \times \sin\alpha\right) BP^2}$$

wherein α is an angle between a diagonal of the sub pixel and the Y direction;

A is the size of the sub pixel in the Y direction;

P is a width of the smallest Moire fringe which can be identified by human eyes;

n is a sampling number for Moire fringes, being a positive integer;

B is a grating pitch of the grating.

Optionally, θ meets:

$$\theta > \arccos \frac{P^2(n^2A^2 + B^2) - A^2B^2}{2nABP^2}.$$

Optionally, θ meets:

$$\theta < 90° - \arccos \frac{P^2(n^2A^2/9 + B^2) - A^2B^2/9}{2nABP^2/3}.$$

Optionally, two sub pixels form a square;

$$\theta = \arctan\left[\left(\frac{T}{m} + \frac{1}{2 \times m}\right)\text{Pixel}\right];$$

T is 1, 2 or 3.

Optionally, one sub pixel forms a square;

θ=arctan [(T+0.5)Pixel];

T is 1, 2 or 3.

Optionally, the sub pixel is a red sub pixel, a blue sub pixel or a green sub pixel.

Optionally, the grating is a slit grating or a lenticular grating.

Optionally, the display panel comprises a liquid crystal display panel;

the grating is arranged on a light input side or a light output side of the liquid crystal display panel.

Optionally, the display panel comprises an organic electroluminescent diode display panel;

the grating is arranged on a light output side of the organic electroluminescent diode display panel.

Apparently, the person skilled in the art may make various alterations and variations to the invention without departing the spirit and scope of the invention. As such, provided that these modifications and variations of the invention pertain to the scope of the claims of the invention and their equivalents, the invention is intended to embrace these alterations and variations.

The invention claimed is:

1. A stereoscopic display device; the stereoscopic display device comprises a display panel and a grating, wherein
the display panel comprises a plurality of first display units and a plurality of second display units, the plurality of first display units and the plurality of second display units are arranged alternately in a Y direction of the display panel; each first display unit and each second display unit respectively comprises m sub pixels arranged in the Y direction forming a square;
wherein m≥1; a size of the sub pixel in the Y direction is smaller than a size of the sub pixel in the X direction, the Y direction being perpendicular to the X direction;
the grating comprises a plurality of optical structures arranged parallel to each other; a preset angle β is arranged between the optical structure and an X direction of the display panel, thereby reducing Moire fringe phenomenon during displaying;

wherein 0.8θ≤β≤1.2θ;

wherein $$\theta = \arctan\left(\frac{T}{2} + 0.25\right);$$

T is a sub pixels number of a layout position difference in the Y direction between two first display units respectively positioned in two adjacent columns, or a sub pixels number of a layout position difference in the Y direction between two second display units respectively positioned in two adjacent columns, T being a positive integer of 1~100.

2. The stereoscopic display device according to claim 1, wherein θ meets:

$$|\alpha - \theta| > \arccos \frac{P^2\left[n^2\left(\frac{A}{3} \times \sin \alpha\right)^2 + B^2\right] - \left(\frac{A}{2} \times \sin \alpha\right)^2 B^2}{2n\left(\frac{A}{3} \times \sin \alpha\right)BP^2}$$

wherein α is an angle between a diagonal of the sub pixel and the Y direction;

A is the size of the sub pixel in the Y direction;

P is a width of the smallest Moire fringe which can be identified by human eyes;

n is a sampling number for Moire fringes, being a positive integer;

B is a grating pitch of the grating.

3. The stereoscopic display device according to claim 1, wherein θ meets:

$$\theta > \arccos \frac{P^2(n^2A^2 + B^2) - A^2B^2}{2nABP^2}.$$

4. The stereoscopic display device according to claim 1, wherein θ meets:

$$\theta < 90° - \arccos \frac{P^2(n^2A^2/9 + B^2) - A^2B^2/9}{2nABP^2/3}.$$

5. The stereoscopic display device according to claim 1, wherein two sub pixels form a square;

$$\theta = \arctan\left(\frac{T}{2} + 0.25\right);$$

T is 1, 2 or 3.

6. The stereoscopic display device according to claim 1, wherein one sub pixel forms a square;

θ=arctan(T+0.5);

T is 1, 2 or 3.

7. The stereoscopic display device according to claim 1, wherein the sub pixel is a red sub pixel, a blue sub pixel or a green sub pixel.

8. The stereoscopic display device according to claim 1, wherein the grating is a slit grating or a lenticular grating.

9. The stereoscopic display device according to claim 1, wherein the display panel comprises a liquid crystal display panel; the grating is arranged on a light input side or a light output side of the liquid crystal display panel; or
the display panel comprises an organic electroluminescent diode display panel; the grating is arranged on a light output side of the organic electroluminescent diode display panel.

10. A method for manufacturing a stereoscopic display device;
the method comprises providing a display panel and a grating, wherein the display panel comprises a plurality of first display units and a plurality of second display units, the plurality of first display units and the plurality of second display units are arranged alternately in a Y direction of the display panel; each first display unit and each second display unit respectively comprises m sub pixels arranged in the Y direction forming a square;
wherein m≥1; a size of the sub pixel in the Y direction is smaller than a size of the sub pixel in the X direction, the Y direction being perpendicular to the X direction;
the grating comprises a plurality of optical structures arranged parallel to each other; a preset angle β is arranged between the optical structure and an X direction of the display panel, thereby reducing Moire fringe phenomenon during displaying;

wherein $0.8\theta \leq \beta \leq 1.2\theta$;

wherein $$\theta = \arctan\left(\frac{T}{m} + \frac{1}{2 \times m}\right);$$

T is a sub pixels number of a layout position difference in the Y direction between two first display units respectively positioned in two adjacent columns, or a sub pixels number of a layout position difference in the Y direction between two second display units respectively positioned in two adjacent columns, T being a positive integer of 1~100.

11. The method according to claim 10, wherein θ meets:

$$|\alpha - \theta| > \arccos \frac{P^2\left[n^2\left(\frac{A}{3} \times \sin \alpha\right)^2 + B^2\right] - \left(\frac{A}{2} \times \sin \alpha\right)^2 B^2}{2n\left(\frac{A}{3} \times \sin \alpha\right) BP^2}$$

wherein α is an angle between a diagonal of the sub pixel and the Y direction;

A is the size of the sub pixel in the Y direction;

P is a width of the smallest Moire fringe which can be identified by human eyes;

n is a sampling number for Moire fringes, being a positive integer;

B is a grating pitch of the grating.

12. The method according to claim 10, wherein θ meets:

$$\theta > \arccos \frac{P^2(n^2 A^2 + B^2) - A^2 B^2}{2nABP^2}.$$

13. The method according to claim 10, wherein θ meets:

$$\theta < 90° - \arccos \frac{P^2(n^2 A^2/9 + B^2) - A^2 B^2/9}{2nABP^2/3}.$$

14. The method according to claim 10, wherein two sub pixels form a square;

$$\theta = \arctan\left(\frac{T}{2} + 0.25\right);$$

T is 1, 2 or 3.

15. The method according to claim 10, wherein one sub pixel forms a square;

θ=arctan(T+0.5);

T is 1, 2 or 3.

16. The method according to claim 10, wherein the sub pixel is a red sub pixel, a blue sub pixel or a green sub pixel.

17. The method according to claim 10, wherein the grating is a slit grating or a lenticular grating.

18. The method according to claim 10, wherein the display panel comprises a liquid crystal display panel; the grating is arranged on a light input side or a light output side of the liquid crystal display panel; or the display panel comprises an organic electroluminescent diode display panel;

the grating is arranged on a light output side of the organic electroluminescent diode display panel.

* * * * *